Aug. 23, 1932.     L. BRUNNER     1,873,281
CONNECTION
Filed June 1, 1931
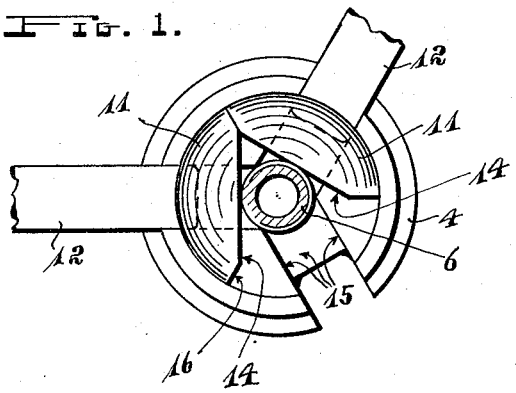
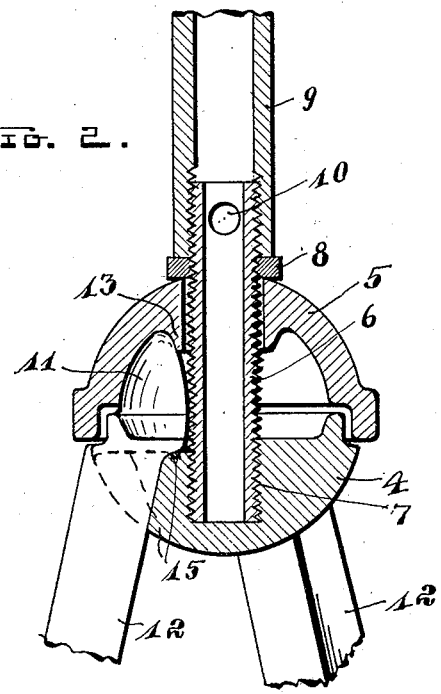
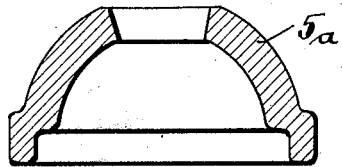
INVENTOR:
LUDWIG BRUNNER,
By: Otto H. Ringer,
his Atty.

Patented Aug. 23, 1932

1,873,281

UNITED STATES PATENT OFFICE

LUDWIG BRUNNER, OF LOS ANGELES, CALIFORNIA

CONNECTION

Application filed June 1, 1931. Serial No. 541,370.

This invention relates to devices used for firmly holding the legs or branches of a tripod or table or any other similar support in a single demountable joint.

One of the objects of this invention is to provide a joining structure by which two or more branches, or legs, can be quickly joined into a single firmly united structure, the structure consisting principally of two oppositely concaved and suitably shaped members between which the ends of such branches or legs can be firmly clamped.

Another object is to provide branch- or leg-ends that will firmly settle between such members.

Other objects will appear from the following description and appended claim as well as from the accompanying drawing, in which:—

Fig. 1 is a fragmentary top plan view of a joining structure with two or three legs placed in proper engaging position within the bottom half of the joining structure, the top-half having been removed to facilitate a better illustration of the joint.

Fig. 2 is a fragmentary vertical mid-sectional view of the joining structure with the two halves of the joint held together by a short piece of tubing.

Fig. 3 is a detail vertical section through a slightly modified form of the top half of the joining structure.

As illustrated, the bottom-half 4 and the top-half 5 are held together by the tubing 6, one end of the tubing being screwed into the bottom-half 4 as indicated at 7, and a nut 8 forcing the top-half against the bottom-half and thereby holding the two halves together.

Instead of the nut 8, of course, a continuation tube-member 9 can be used to abut with its end against the top-half for holding the two halves together, in which case no extra nut is required.

By indicating the hole at 10 in the tube 6 it will be understood that the whole structure with legs or branches can be suspended by this tube; and it will also be understood that any eye-bolt, obtainable on the open market, can be used for holding the two halves together, in case that the structure is to be suspended.

A chandelier, for instance, may be provided with a joining structure of this type, the ends of the several branches for ornaments or lights can then be held firmly by this type of structure.

Whether used in a suspended device, such as a chandelier, or a supporting device, such as a tripod or table, the ends 11 of the legs or branches 12 are designed to become firmly encased and locked between the two halves of the joining structure in the manner illustrated in Figs 1 and 2.

While in the illustration of Fig. 2 a special raised bead-like center portion 13 is provided to engage the ends 11, in the slightly modified form illustrated in Fig. 3 the hollow of the top-half is of a smooth spherical form with no extra bead or engaging portion, the smooth inside of this top-half of this slightly modified form being the only engaging means for the ends 11.

The ends 11 in the form illustrated in Fig. 2 are held between the recessed shoulder 15 in the bottom-half and the beaded top-half with no absolute necessity of exacting any pressure upon the sides of the connecting tube member 6.

With the slightly modified form illustrated in Fig. 3, of the top-half 5a, on the other hand, the inner faces 14 may be caused to rest against the sides of the tube-member 6 as clearly illustrated in Fig. 1, though this also is not absolutely necessary, since the side edges of the ends are abutting against one another between the several ends in a joint.

Having indicated three positions for legs or branches in Fig. 1, it must, of course, be understood that two or more legs or branches can in this manner be held in a joint of this type.

Having thus described my invention, I claim:

In a joint, a joining structure made of oppositely engaging halves with recesses between the halves for holding branch-members in engagement, the one half being provided with a threaded bore in its inside, the other half being provided with an aperture, and a substantially semi-spherical hollow inside branch-members having ends of substantially segmental semi-spherical form adapted to firmly seat within the recesses between the halves, and a connecting member inserted through the aperture of the one half and engaged in the threaded bore of the other half for holding the two halves together and thereby clamping the ends of the said branch-members rigidly to said joining structure and thereby to the connecting member.

In testimony that I claim the foregoing as my invention I have signed my name.

LUDWIG BRUNNER.